(12) United States Patent
Bottari et al.

(10) Patent No.: US 8,711,719 B2
(45) Date of Patent: Apr. 29, 2014

(54) GENERATING NETWORK TOPOLOGY PARAMETERS AND MONITORING A COMMUNICATIONS NETWORK DOMAIN

(75) Inventors: Giulio Bottari, Leghorn (IT); Enrico Dutti, Leghorn (IT); Silvia Pucci, Pisa (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 272 days.

(21) Appl. No.: 13/132,904

(22) PCT Filed: Dec. 3, 2008

(86) PCT No.: PCT/EP2008/066738
§ 371 (c)(1),
(2), (4) Date: Aug. 19, 2011

(87) PCT Pub. No.: WO2010/063321
PCT Pub. Date: Jun. 10, 2010

(65) Prior Publication Data
US 2011/0292832 A1 Dec. 1, 2011

(51) Int. Cl.
*G01R 31/08* (2006.01)
*G06F 11/00* (2006.01)
*H04L 12/40* (2006.01)
*H04L 12/28* (2006.01)

(52) U.S. Cl.
CPC ......... *H04L 12/4013* (2013.01); *H04L 12/2865* (2013.01); *H04L 12/2867* (2013.01)
USPC ............ 370/252; 370/255; 370/401; 709/222

(58) Field of Classification Search
None
See application file for complete search history.

(56) References Cited

U.S. PATENT DOCUMENTS

| | | | |
|---|---|---|---|
| 2001/0017845 A1* | 8/2001 | Bauer | 370/238 |
| 2003/0117966 A1* | 6/2003 | Chen | 370/255 |
| 2004/0190457 A1* | 9/2004 | Mohr | 370/241 |
| 2005/0160171 A1* | 7/2005 | Rabie et al. | 709/227 |
| 2009/0324232 A1* | 12/2009 | So | 398/83 |
| 2010/0061231 A1* | 3/2010 | Harmatos et al. | 370/228 |

OTHER PUBLICATIONS

K. Kompella et al., "Label Switched Paths (LSP) Hierarchy with Generalized Multi-Protocol Label Switching (GMPLS) Traffic Engineering (TE)," Oct. 2005, 14 pages, Network Working Group, Request for Comments: 4206, The Internet Society.

International Search Report, Application No. PCT/EP2008/066738, dated Jul. 7, 2009, 1 page.

D. Awduche et al., "RSVP-TE: Extensions to RSVP for LSP Tunnels," Network Working Group, Request for Comments 3209, Dec. 2001, 62 pages, The Internet Society.

(Continued)

*Primary Examiner* — Yemane Mesfin
*Assistant Examiner* — Christine Duong
(74) *Attorney, Agent, or Firm* — Blakely Sokoloff Taylor Zafman LLP

(57) ABSTRACT

A method of generating network topology parameters of a communications network domain comprising a plurality of network nodes and a plurality of interconnecting links. The method comprises: identifying network nodes configured to interface with one or more other network domains as summarized nodes; and generating network topology parameters for one or more pairs of summarized nodes. The network topology parameters are dependent on the transmission parameters of one or more identified paths between said pair of summarized nodes. At least one said path comprises at least one other network node and respective interconnecting links.

26 Claims, 5 Drawing Sheets

(56) References Cited

OTHER PUBLICATIONS

International Preliminary Report on Patentability, Application No. PCT/EP2008/066738, dated Jun. 7, 2011, 9 pages.

EPO Communication pursuant to Rules 161(1) and 162 EPC, Application No. 08875411.4, dated Jul. 12, 2011, 2 pages.

EPO Communication pursuant to Article 94(3) EPC, Application No. 08875411.4, dated Sep. 13, 2012, 6 pages.

Awduche, D., et al., "Requirements for Traffic Engineering Over MPLS", *Network Working Group, Request for Comments 2702*, Sep. 1999, 29 pages, The Internet Society.

* cited by examiner (a)

(b)

GENERATING NETWORK TOPOLOGY PARAMETERS AND MONITORING A COMMUNICATIONS NETWORK DOMAIN

CROSS-REFERNECE TO REALATED APPLIATIONS

This application is a National stage of International Application No. PCT/EP2008/066738, filed Dec. 3, 2008, which is hereby incorporated by reference.

FIELD OF THE INVENTION

The invention relates to a method of generating network topology parameters of a communications network domain and a communications monitoring apparatus for monitoring a communications network domain.

BACKGROUND OF THE INVENTION

In automatic switched optical communications networks, comprising a plurality of network nodes with interconnecting links between respective pairs of nodes, it is necessary for network domains within the network to exchange topology information; in automatic switched transport networks (ASTN) this is carried out using a routing protocol such as optical shortest path first (OSPF) or intermediate system to intermediate system (ISIS). The topology information is required by path computation elements within the network domains for computing paths through the network, including alternative paths to restore failed circuits in case a fault is detected in the network and the fault affects the route of one or more signaled paths. During a path computation of a new route through a network, with certain Traffic Engineering characteristics and technology related limitations, the reachability of resources is taken into account together with the characteristics of each interconnecting link reported by the routing protocol.

The time required to carry out a path computation is a function of the number of nodes and interconnecting links in the network. The paths may be determined using a modified Dijkstra algorithm, using the Landau notation, which has a running time equal to $O(L^2)$, where L is the number of interconnecting links. This means that in big networks the running time of the algorithm can become long, causing higher traffic loss intervals and resulting in the non-achievement of Service Level Agreements stipulated between a network operator and its customers.

In addition, ASTNs owned and operated by different operators are often required to be interconnected, and each operator needs to disclose network topology information to the other operators in order to enable the other operators to route traffic through that network. It is often commercially desirable not to have to disclose network topology information to other network operators in order not to reveal business critical information, particularly regarding the physical structure of the network.

SUMMARY OF THE INVENTION

It is an object to provide an improved method of generating network topology parameters of a communications network domain and an improved communications monitoring apparatus for monitoring a communications network domain.

According to a first aspect of the invention there is provided a method of generating network topology parameters of a communications network domain comprising a plurality of network nodes and a plurality of interconnecting links. The method comprises identifying network nodes configured to interface with one or more other network domains as summarized nodes. One or more available network domain paths between a pair of summarized nodes are identified. At least one said network domain path between said pair of summarized nodes comprises at least one other network node and respective interconnecting links. The method further comprises generating network topology is dependent on a respective transmission parameter of the said available network domain paths.

The method of the invention allows the generation of network topology parameters for a network domain which preserve the transmission parameters of network domain but which represent the topology of the network domain as comprising a lower number of links and nodes. The network topology parameters can be used by other network domains to carry out path computations across a network including the said network domain. This enables an operator to share sufficient information about its network domain with other operators, in order to allow them to route traffic through it, without revealing the full details of the network domain topology to the other operators.

The network topology parameters generated by the method reduce the number of nodes and links which must be considered by other network domains when carrying out path computations across the said network domain, but preserves the transmission parameter data of the said network domain. This enables the time to carry out path computations across a network including the said network domain to be reduced, and increases the computational efficiency, providing the operator with the benefit of shorter traffic disruption in case of rerouting after a network failure. By representing the network domain topology with a lower number of nodes and links, and thus a lower path computation time, the scalability of a network comprising network domains having the said network topology parameters is increased.

In an embodiment, the network topology parameters are dependent on the corresponding transmission parameters of the said one or more available paths. The network topology parameters therefore fully represent the said one or more paths.

A said transmission parameter may comprise one of bandwidth, administrative colour, administrative cost, traffic engineering cost, optical signal to noise ratio (OSNR), polarization mode dispersion (PMD) and nonlinear phase shift (NLPS).

Administrative colour is an administratively assigned attribute ("resource class") which express some notion of "class" for network resourced and are used to constrain the routing of traffic through specific network resources (Internet Engineering Task Force (IETF) RFC 2702 6.2).

In an embodiment the method further comprises advertising said network topology parameters to another network domain.

In an embodiment where there are a plurality of available network domain paths between a said pair of summarized nodes, the method further comprises the steps of: determining whether a transmission parameter of a first said path would allow the path to be bundled with another said path; comparing any such transmission parameter with the or each transmission parameter of any previously determined paths to determine whether there exists a previously determined path which has a matching transmission parameter; and, if a matching transmission parameter is found, adding the bandwidth of the first path to the bandwidth of the said other path to form a bundled path. Where a matching characteristic is found, the method comprises setting the administrative cost or traffic engineering cost of the bundled path to the lower of the said cost of the path and the previously determined path. Bundling is a process that alters the representation of a group of resources. From a group of N resources which share a common parameter one can obtain a single resource with similar parameters. The advantage of this approach is that it reduces the amount of data needed to describe a set of resources.

In an embodiment the method additionally comprises storing the identified paths and associating the said paths with the target node.

In an embodiment, identifying the or each available network domain path and generating network topology parameters for a said pair of summarized nodes by applying the Bellman-Ford algorithm. In an embodiment the Bellman-Ford algorithm performs a number of relaxation steps dependent on the number of network nodes. Using the Bellman-Ford algorithm, which does not apply any filtering to the relaxation steps, ensures a comprehensive traverse of the network domain is undertaken and all of the potential paths through the network domain are identified and their transmission parameters returned.

In an embodiment, each relaxation step of the Bellman-Ford algorithm returns one or more transmission parameters of the path being determined. Transmission parameters are thereby obtained for each identified path.

The method may further comprise generating the network topology parameters by comparing the said returned transmission parameters with network domain resource parameters and if a network domain resource parameter has a lower value than the respective transmission parameter, setting the transmission parameter to the network domain resource parameter value.

In an embodiment, the administrative cost or traffic engineering cost is a cumulative cost, and is most preferably determined by summing the respective costs of each network link comprising the path. The administrative colour may comprise a colour mask comprising the administrative colours of the network links comprising the path. The method may further comprise comparing the said cumulative cost to a predetermined maximum cost and if the said cumulative cost is higher than the maximum cost setting the cumulative cost to the maximum cost. This prevents a path being determined with a cumulative cost that is higher than a maximum acceptable value.

In an embodiment, where a path comprises a plurality of network links, the bandwidth of the path is set to the lowest bandwidth of the network links comprising the path. The method may comprise setting the bandwidth of the path by: (i) setting the bandwidth of the path to the bandwidth of a first network link of the path; (ii) selecting the next network link of the path as the current link and comparing the bandwidth of the current link to the bandwidth of the path; (iii) if the bandwidth of the current link is lower than the bandwidth of the path, setting the bandwidth of the path to the bandwidth of the current link; and (iv) repeating steps (ii) and (iii) for each network link of the path.

In an embodiment, each network node is provided with a transport network assigned address, and the method comprises at least one summarized node having the transport network assigned address of one or more of the network nodes associated with it. A single summarized node may have the transport network assigned addresses of all of the network nodes associated with it. Alternatively, a plurality of summarized nodes may each have the transport network assigned addresses of a sub-set of the network nodes associated to them.

According to a second aspect of the invention there is provided communications monitoring apparatus for monitoring a communications network domain comprising a plurality of network nodes and a plurality of interconnecting links. The communications monitoring apparatus comprises a processor and memory and is arranged to: identify network nodes configured to interface with one or more other network domains as summarized nodes; and generate network topology parameters for respective pairs of summarized nodes. The network topology parameters being dependent on the transmission parameters of one or more available paths between each said respective pair of summarized nodes. At least one said path comprises at least one other network node and respective interconnecting links.

The communications monitoring apparatus of the invention is operable to generate network topology parameters for a network domain which preserve the transmission parameters of network domain but which represent the topology of the network domain as comprising a lower number of links and nodes. The network topology parameters can be used by other network domains to carry out path computations across a network including the said network domain. This enables an operator to share sufficient information about its network domain with other operators, in order to allow them to route traffic through it, without revealing the full details of the network domain topology to the other operators.

The communications monitoring apparatus is operable to generate network topology parameters which reduce the number of nodes and links which must be considered by other network domains when carrying out path computations across the said network domain, but preserve the transmission parameter data of the said network domain. This enables the time to carry out path computations across a network including the said network domain to be reduced, and increases the computational efficiency, providing the operator with the benefit of shorter traffic disruption in case of rerouting after a network failure. Reducing the number of nodes and links, and thus the path computation time, also increases the scalability of a network comprising the said communications monitoring apparatus.

In an embodiment, the network topology parameters are dependent on the corresponding transmission parameters of the said one or more identified paths.

The communications monitoring apparatus may comprise one of a path computation element, a router controller and a network node. The network node may comprise a dense wavelength division multiplexed automatic switched optical network enabled node configured to interact with a synchronous digital hierarchy network node.

The communications monitoring apparatus may be configured to provide an output signal comprising said network topology parameters, for delivery to an external network or another communications monitoring apparatus. The communications monitoring apparatus may be further arranged to advertise said network topology parameters to another network domain or another communications monitoring apparatus. In an embodiment, the communications monitoring apparatus is further arranged to receive network topology parameters relating to another communications network domain.

In an embodiment, each network node is provided with a transport network assigned address, and the communications monitoring apparatus is further arranged to associate the transport network assigned address of one or more of the network nodes with at least one summarized node and to advertise to another communications network monitoring apparatus the said transport network assigned addresses associated with the or each said summarized node. The communications monitoring apparatus may further be configured to select the transport network assigned addresses to be advertised as associated with the summarized node.

The communications monitoring apparatus may be arranged to identify network nodes configured to interface with one or more other network domains as summarized nodes and generate network topology parameters each time the network domain is modified. Alternatively, the communications monitoring apparatus may be arranged to identify network nodes configured to interface with one or more other network domains as summarized nodes and generate network topology parameters at a predetermined frequency.

According to a third aspect of the invention there is provided a computer programme product comprising programme code for performing any of the above steps of the method of generating network topology parameters of a communications network domain comprising a plurality of network nodes and a plurality of interconnecting links.

According to a fourth aspect of the invention there is provided a data carrier having computer readable instructions embodied therein for providing access to resources available on a processor, the computer readable instructions comprising instructions to cause the processor to perform any of the above steps of the method of generating network topology parameters of a communications network domain comprising a plurality of network nodes and a plurality of interconnecting links.

According to a fifth aspect of the invention there is provided a communications network path computation engine configured to implement any of the above steps of the method of generating network topology parameters of a communications network domain comprising a plurality of network nodes and a plurality of interconnecting links.

Embodiments of the invention will now be described in more detail, by way of example only, with reference to the accompanying drawings.

DESCRIPTION OF EMBODIMENTS OF THE INVENTION

Figure 1:
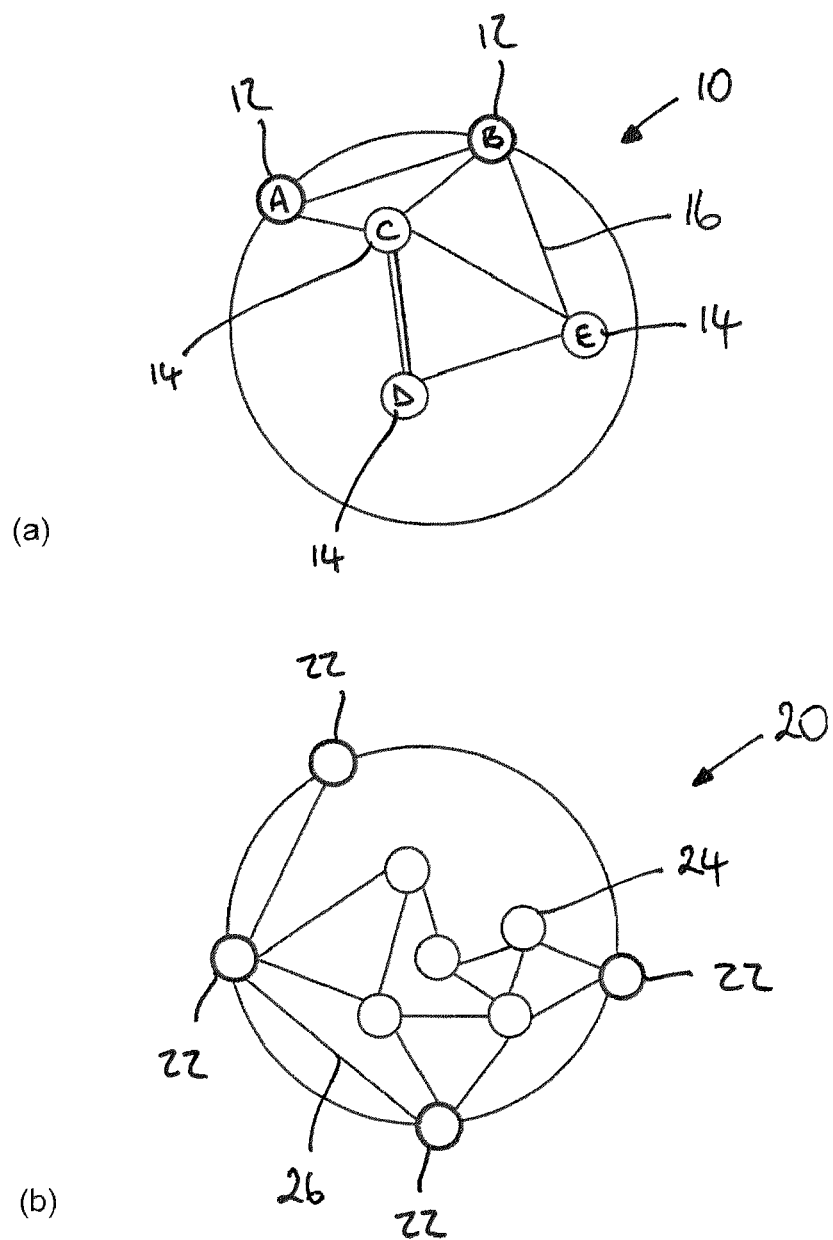
FIG. 1(a) is a diagrammatic representation of a first network domain comprising five network nodes and seven interconnecting links.
FIG. 1(b) is a diagrammatic representation of a second network domain comprising nine network nodes and thirteen interconnecting links.
Figure 2:
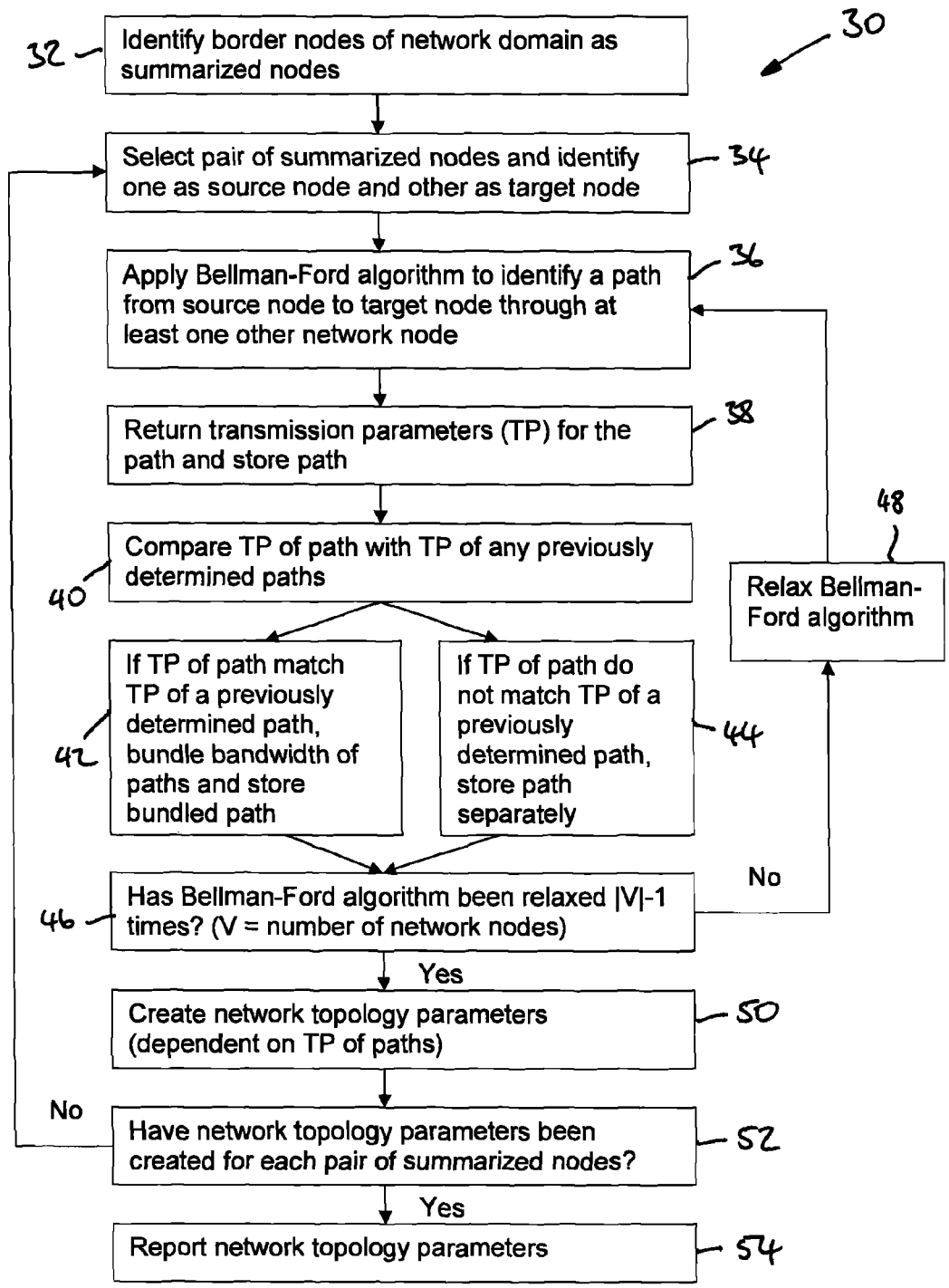
FIG. 2 is a flow chart of a method of generating network topology parameters of a communications network domain comprising a plurality of network nodes and a plurality of interconnecting links according to a first embodiment of the invention.
Figure 3:
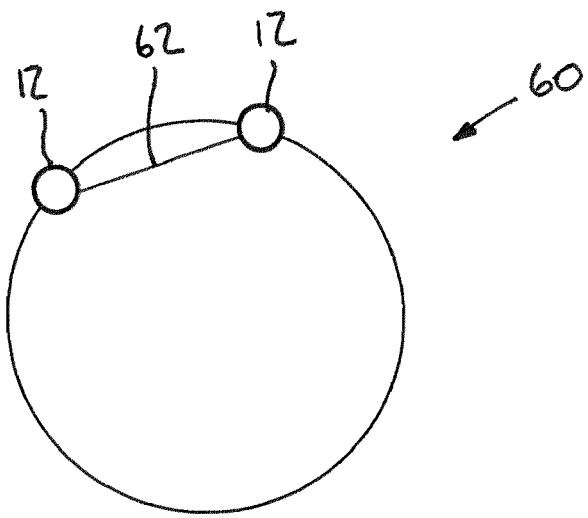
FIG. 3(a) is a diagrammatic representation of an equivalent summarized topology of the network domain of FIG. 1(a) generated using the method of the first embodiment.
FIG. 3(b) is a diagrammatic representation of an equivalent summarized topology of the network domain of FIG. 1(b) generated using the method of the first embodiment.
Figure 3:
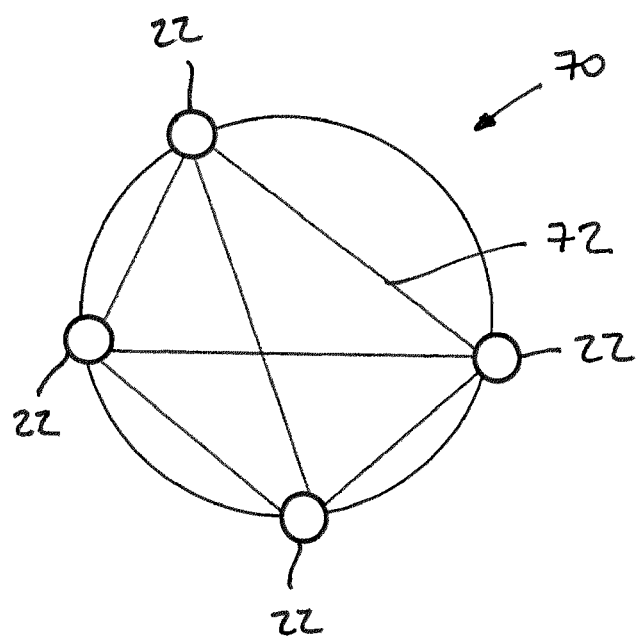

Referring to FIGS. 1 to 3, a first embodiment of the invention provides a method 30 of generating network topology parameters of a communications network domain 10, 20. The communications network domain 10 shown in FIG. 1(a) comprises five network nodes 12, 14 and seven interconnecting links 16, each interconnecting link 16 connecting two nodes 12, 14, e.g. AB, CD, DE etc. A second communications network domain 20 is shown in FIG. 1(b) and comprises nine network nodes 22, 24 and thirteen interconnecting links 26.

Each interconnecting link 16 has transmission parameters associated with it, which in this example comprise a label identifying the administrative colour of the link 16, the bandwidth of the link and the traffic engineering cost of the link. This information is typically stored centrally, for example in the memory of a router or path computation engine of the network domain 10.

The method 30 identifies network nodes 12, 22 configured to interface with one or more other network domains (often referred to as border nodes) as summarized nodes 32, and generates network topology parameters for each pair of summarized nodes 34-52. The generated network topology parameters can by represented by an equivalent summarized topology 60, 70, as shown in FIGS. 3(a) and 3(b), which is what the domains 10, 20 look like to the outside world, i.e. other network domains. The network topology parameters for each pair of summarized nodes 12, 22 are represented by summarized links 62, 72 in the figures. The network topology parameters are dependent on the transmission parameters of the available paths between each pair of summarized nodes 12, 22 through the respective network domain 10, 20. Each path between the summarized nodes 12, 22 comprises at least one other ("intermediate") network node 14, 24 and respective interconnecting links 16, 26 of the network domain 10, 20. The number of equivalent summarized nodes 12, 22 and equivalent summarized links 62, 72 in the equivalent summarized topology 60, 70 is therefore less than the number of actual network nodes 12, 14, 22, 24 and interconnecting links 16, 26.

The method uses the Bellman-Ford algorithm which is a well known graph search algorithm which computes single source shortest-paths in a weighted directed graph (digraph) and is often used in routing. The network domain 10, 20 is considered as a weighted digraph in which the network nodes 12, 14, 22, 24 comprise the vertices of the weighted digraph and the interconnecting links 16, 26 comprise the edges of the weighted digraph. Each edge has one or more labels ("weights" or "costs") associated with it, which in the case of a network domain comprise the transmission parameters of the interconnecting links 16, 26.

The Bellman-Ford algorithm generates a table of all available paths between two summarized nodes 12, 22 within a network domain 10, 20 by identifying a first path between the summarized nodes 12, 22 through the network domain 10, 20 and returning the transmission parameters (weights) of the interconnecting links 16, 26 (edges) comprising the path. The transmission parameters are returned from the central store of transmission parameters. The algorithm is then "relaxed", i.e. repeated/iterated, to thereby identify a second, different path between the summarized nodes 12, 22 through the domain 10, 20 and the transmission parameters of the links comprising the second path are returned by the algorithm. The algorithm is run repeatedly for a number of relaxation steps (iterations), the number being equal to the number of vertices (nodes) minus 1, each relaxation step identifying a different path between the summarized nodes 12, 22 through the network domain and returning the transmission parameters of the network links 16, 26 comprising the path.

The network topology parameters are created as follows for each pair of summarized nodes 12, 22. A pair of summarized nodes 12, 22 is selected and one summarized node 12, 22 is identified as the source node of the pair and the other as the target node of the pair 34. The Bellman-Ford algorithm is then run on/applied to 36 the pair of summarized nodes 12, 22, running |V|−1 relaxation steps 46, 48, where V is the number of network nodes 12, 14, 22, 24 of the domain 10, 20, in order to identify all the available paths from the source node to the target node, each path passing through at least one intermediate network node 14, 24. Each relaxation step of the Bellman-Ford algorithm returns the transmission parameters for each network node and each interconnecting link in the path 38. The transmission parameter information includes the cumulative administrative cost (label) or traffic engineering (TE) cost (label) of the path, the administrative colour of the path (or of each of the interconnecting links in the path), and the bandwidth of the path, which is set to the bandwidth of the lowest bandwidth link in the path. The transmission parameter information may also include one or more of optical signal to noise ratio (OSNR), polarization mode dispersion (PMD) and nonlinear phase shift (NLPS).

The transmission parameters relating to each identified path are centrally stored in random access memory (RAM) accessible by the algorithm and associated with the target summarized node 12, 22. The transmission parameters of each path (the "current path") is compared with the transmission parameters of all previously identified, and stored, paths 40, in order to determine if any of the technology specific transmission parameters which would allow path bundling, such as administrative colour, matches that of a previously determined path 42. If a match is found, the bandwidth of the current path is bundled with the bandwidth of the previously determined path, to generate a bundled path, and the administrative cost of the bundled path is set to the lower of the administrative cost of the previously determined path and the current path 42. If a match is not found 44, the current path is stored separately.

Bundling is a process that alters the representation of a group of resources. From a group of N resources which share a common parameter, such as administrative colour, one can obtain a single resource with similar parameters. The advantage of this approach is it reduces the amount of data needed to describe a set of resources. For example, if there are two different possible paths between two nodes, that have the same administrative colour, the paths can summarized ("bundled") into a single path having a bandwidth equal to the sum of the bandwidths of the two paths, with the same colour. Where the TE costs are different, the TE cost of the summarized resource can be set to the lower/higher of the two TE costs, or their average, as desired.

After applying the Bellman-Ford algorithm, the target summarized node has a table comprising a number of paths between the source and target summarized nodes, each path having associated transmission parameters. The transmission parameters are then reviewed to determine whether the bandwidths obtained for the paths can be implemented, as will be described in more detail below. The resulting, potentially modified, transmission parameters become the network topology parameters for the selected summarized nodes 50.

Where there are more than two summarized nodes 22 in the network domain 20, as in FIG. 1(*b*), a second pair of summarized nodes is selected and the above process repeated for that pair of summarized nodes. The selection of pairs of summarized nodes is repeated until network topology parameters have been created for each pair of summarized nodes 52.

The network topology parameters for each pair of summarized nodes 52 are stored in memory and transmitted to other entities.

In more detail, the Bellman-Ford algorithm is applied as follows, in respect of the network topology 10 of FIG. 1(*a*). In this example, the application of the algorithm has been partially simplified compared to a standard Bellman-Ford algorithm because none of the interconnecting links have a negative weight, since both administrative cost and TE cost are defined as positive. Following the identification of all of the available paths by the Bellman-Ford algorithm the transmission parameters are reviewed in a path pruning step, to determine whether the available resources, such as bandwidth, within the network domain (provided as network resource parameters) allow the bandwidths of the paths to be implemented.

```
procedure TE_aggregation_BellmanFord(router_list, link_list, initial_router,
end_router)
    // The input parameters are:
    // - the list of network nodes ("routers") in the network domain to be summarized
    // - the list of all network links of the network domain
    // - a source summarized node
{
    //Initialization
    for each router named NODE in router_list {
        if NODE is initial_router then NODE.paths = path_with_no_cost_and_full
resources
        else NODE.paths = empty list
    }
    for i from 1 to number_of_elements(link_list)-1 { //"cycle 1"
        for each link named S-Dx in link_list {
            // link S-Dx is a link between node S(ource) to node D(estination)
            // node D(estination) is the target node
            node Source = S-Dx.source
            node Destination = S-Dx.destination
            for each PATH on Source {
                if PATH does not include link S-Dx and does not pass from node Destination
(to avoid loops) {
                    D.available_paths = D.available_paths + PATH merged to S-Dx:
```

```
    }
  }
  For each PATH in end_router.paths, starting with lower cost paths, compute the
  restrictions and evaluate if there is any over-allocation of resources and in case
  delete/reduce the needed path.
}
```

Referring to FIG. 1(a), A and B are summarized nodes (border nodes) and C, D and E are intermediate network nodes. The links in the network domain 10 have the following names and transmission parameters (TE cost (TEM), free Bandwidth, administrative colour):

AB (50, 4, 2)
AC (10, 10, 3)
CB (80, 5, 2)
CD1 (20, 3, 3)
CD2 (20, 3, 2)
CE (30, 2, 3)
DE (30, 7, 3)
EB (10, 5, 3)

In this example, each link is considered as unidirectional in order to make the example simpler. It will be appreciated that in a real network links may be bi-directional, so for example link BA will exist in addition to AB.

Applying the Bellman-Ford algorithm procedure as detailed above to determine the available paths from A to B:
AB, AC, CB, CD1, CD2, CE, DE, EB.
Looking at link AB:
We find Path AB that goes from A to B (50,4,2)
Looking at link AC:
We find Path AC that goes from A to C (10,10,3)
Looking at link CB:
We find no extra path for B because link CB cannot be merged to Path
AC (they have different administrative Colours)
Looking at link CD1:
We find Path AC-CD1 that goes from A to D (30,3,3)->
  The TEM 31 is 10+20 (TE cost is added)
  The Bandwidth is 3 because that is the maximum that can be allocated on all links (AC has a Bandwidth of 10 and CD1 has a Bandwidth of 3, and the Bandwidth of the Path must be set to the lowest Bandwidth of the links)
  The colour is 3 because it is the same on both links
Looking at link CD2:
We find no extra path for D because link CD2 cannot be merged to Path
AC (they have different administrative Colours)
Looking at link CE:
We find Path AC-CE that goes from A to E (40,2,3)->
  The TEM 40 is 10+30 (TE cost is added)
  The Bandwidth is 2 because that is the maximum that can be allocated on all links (AC has a Bandwidth of 10 and CE has a Bandwidth of 2)
  The colour is 3 because it is the same on both links
Looking at link DE:
We find Path AC-CD1-DE that goes from A to E (60,3,3)->
  The TEM 60 is 30+30 (TE cost is added)
  The Bandwidth is 3 because that is the maximum that can be allocated on all links (the links have Bandwidths of 10, 3 and 3 respectively)
  The colour is 3 because it is the same on all links
Looking at link EB:
We find Path AC-CD1-DE-EB that goes from A to B (70, 3,3)->
  The TEM 70 is 60+10 (TE cost is added)
  The Bandwidth is 3 because that is the maximum that can be allocated on all links (the links have Bandwidths of 10, 3, 3 and 3 respectively)
  The colour is 3 because it is the same on all links
We find Path AC-CE-EB that goes from A to B (50,2,3)->
  The TEM 50 is 40+10 (TE cost is added)
  The Bandwidth is 2 because that is the maximum that can be allocated on all links (the links have Bandwidths of 10, 2 and 3 respectively, and the Bandwidth for the path must be set to the lowest value)
  The colour is 3 because it is the same on all links Providing the list of links in the above order we have to perform "cycle 1" just once to get all the possible paths; extra relaxation steps will give no more information. If the list of links had been given in the reverse order, the final result would have been the same but would have needed many more iterations of "cycle 1" in order to achieve it.

At the end of cycle 1 we have the following paths from A to B:
Path AB that goes from A to B (50,4,2)
Path AC-CE-EB that goes from A to B (50,2,3)
Path AC-CD1-DE-EB that goes from A to B (70,3,3)

The paths are ordered based according to cost criteria (lowest TE cost and lowest number of network links).

Now we have to check if all of the determined paths can be used:
AB can be setup and consumes all the bandwidth on link AB
AC-CE-EB can be setup and consumes a bandwidth of 2 on links AC-CE-EB
AC-CD1-DE-EB cannot be setup because the network resource parameters indicate that link AC only has a remaining free bandwidth of 1. So we must change
Path AC-CD1-DE-EB that goes from A to B (70,3,3) having a Bandwidth of 3
To
Path AC-CD1-DE-EB that goes from A to B (70,1,3 having a Bandwidth of 1, since the maximum available Bandwidth that we can allocate is 1.

Following the application of the Bellman-Ford algorithm, node A can summarize its connectivity to node B with the following paths:
Path AB that goes from A to B (50,4,2)
Path AC-CE-EB that goes from A to B (50,2,3)
Path AC-CD1-DE-EB that goes from A to B (70,1,3)

Network topology parameters for summarized nodes A and B 12 are created from these three paths, resulting in network topology parameters which are dependent on the transmission parameters of the above three paths. As can be seen from path AC-CD 1-DE-EB, while the network topology parameters are dependent on the transmission parameters of the available paths, they may are not always a direct mapping of the transmission parameters of the interconnecting links comprising the paths, as network resource parameters, such as remaining available bandwidth, may need to be taken into consideration.

In this example, the network topology parameters are created, as described above, every time that a change occurs in the topology or transmission parameters of the network domain 10. Alternatively, the network topology parameters can be created at a predetermined frequency, or can be created in response to a request or instruction, with the network topology parameters remaining static in between times.

Each network node is provided with a transport network assigned (TNA) address. Summarized node A 12 has the TNA address of each of the network nodes 12, 14 associated with it. Alternatively, each of the summarized nodes A and B 12 can have the TNA addresses of a sub-set of the network nodes 14 associated to them.

In this example, the network topology parameters are represented by equivalent summarized links 62, 72 within an equivalent summarized topology 60, 70. The equivalent summarized links in the summarized topology 70 shown in FIG. 3(b) are arranged in a full mesh network. The equivalent summarized topology is what the network domains 10, 20 look like to the outside world.

The network topology parameters and the TNA addresses associated with summarized node A 12 are advertised to other network domains connected to the said network domain 10. The network topology parameters and the TNA addresses may be advertised by being broadcast following creation to the said other network domains or may be provided to one or more said other network domains in response to a request from said other network domain.

The method 30 therefore provides network topology parameters for the network domain 10, 20 being considered which may be provided to other network domains. The other network domains are thereby provided with the necessary information to enable the operators of the other network domains to route traffic across the said network domains 10, 20, but the true topology of the network domains 10, 20 is not disclosed, thereby preserving commercially sensitive information relating to the actual network architecture of the network domains 10, 20. The network topology parameters also result in a reduction in the number of nodes and links, while preserving all of the necessary transmission parameter information, which must be considered when making path computations including the said network domains 10, 20, thereby reducing the time taken to make the path computations.

Figure 4:
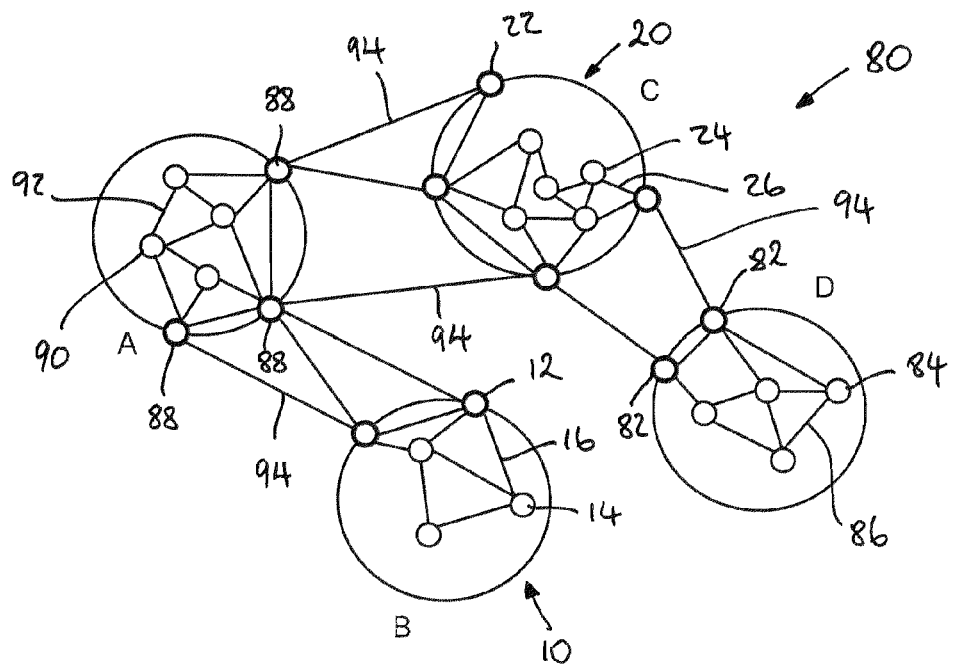
FIG. 4 is a diagrammatic representation of a communications network comprising four network domains A, B, C and D.
Figure 5:
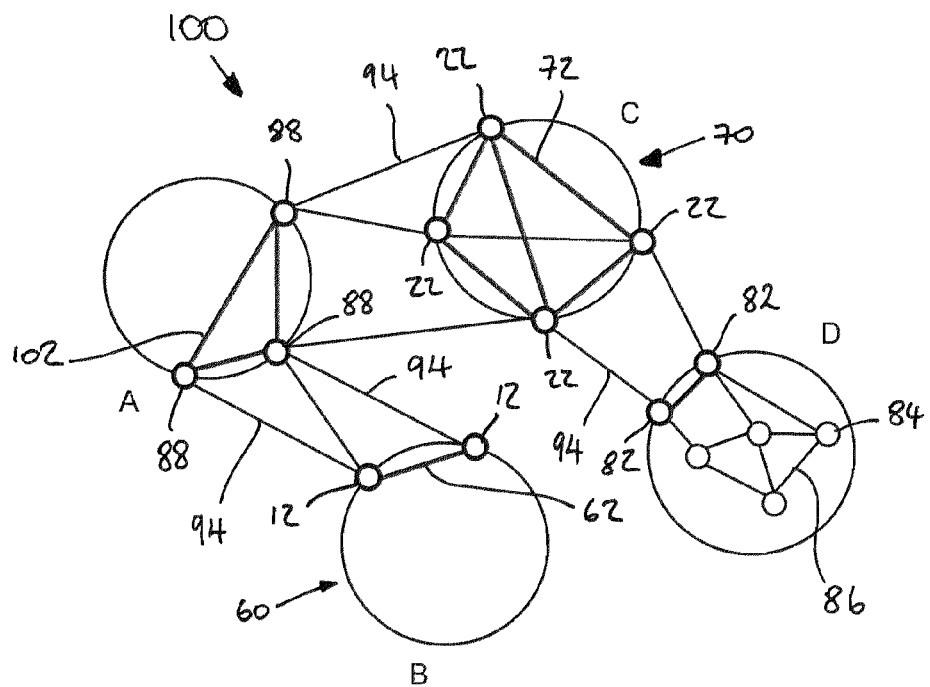
FIG. 5 is a diagrammatic representation of the communications network of FIG. 4 following generation of network topology parameters for domains A, B and C, as seen from domain D.
Figure 6:
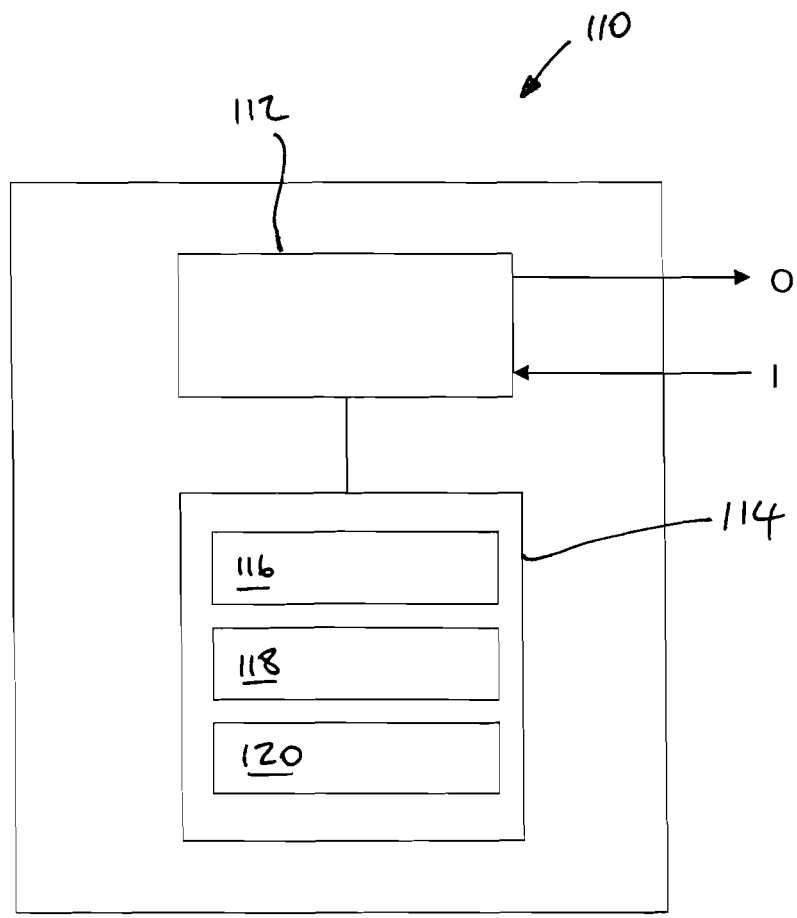
FIG. 6 is a diagrammatic representation of a communications monitoring apparatus according to a second embodiment of the invention.

Referring to FIGS. 4 to 6, a second embodiment of the invention provides communications monitoring apparatus 110, as shown in FIG. 6, for monitoring a communications network domain, such as those shown in FIGS. 1(a) and 1(b), comprising a plurality of network nodes 12, 14, 22, 24 and a plurality of interconnecting links 16, 26. In this example, the communications monitoring apparatus comprises a router controller 110 comprising a processor 112 and memory 114, 116, 118, 120 and is arranged to identify network nodes 12, 22 configured to interface with one or more other network domains as summarized nodes and generate network topology parameters for respective pairs of summarized nodes 12, 22. The network topology parameters are dependent on the transmission parameters of identified paths between each respective pair of summarized nodes 12, 22. Each path comprises at least one other (intermediate) network node 14, 24 and respective interconnecting links 16, 26.

The processor 112 is arranged to implement the steps of the method 30 described above. The Bellman-Ford algorithm is stored within the memory 116 of the router controller 110. The transmission parameters of the interconnecting links 16, 26 are stored within the memory 118 of the router controller 110 and the network topology parameters generated by the method 30 and the TNA addresses of the nodes are stored in the memory 120 of the router controller 110. The network topology parameters for each pair of summarized nodes are associated with the target node of each pair.

The processor 112 is further arranged to generate an output signal O comprising the network topology parameters and TNA addresses, to advertise the network topology parameters and TNA addresses in broadcast mode or on request, as described above. The processor 112 is further arranged to receive corresponding input signal I from one or more other network domains or router controllers to which it is connected.

Referring to FIG. 4, a communications network 80 comprising four network domains A 90, B 10, C 20 and D each comprising a router controller 110 will appear, as from the router controller 110 in domain D, to comprise a network topology as shown in FIG. 5 (the communications network 80 is shown as viewed from within network domain D, and its topology therefore does not appear summarized). The transmission parameters of each interconnecting link 16, 26, 86, 92 are stored within the memory 118 of the respective router controller 110. The network topology parameters generated for each domain A 90, B 10, C 20 and D, and the TNA addresses of the nodes, are also stored within the memory 120 of the respective router controller 110. The network topology parameters are then used (read copied and adapted) in routing messages to be exchanged between the nodes of the network domains.

The summarized view of the communications network 80, as seen from domain D, comprises network topology parameters for each network domain A-C, represented by equivalent summarized topologies 100, 60, 70 in the Figures, plus the real topology of domain D. Path computations performed by the router controller 110 within domain D, therefore only have to consider the network topology parameters of domains A-C plus the transmission parameters for domain D, that is to say ten summarized nodes 12, 22, 88 plus the network nodes 82, 84 of domain D, network topology parameters (illustrated by the ten equivalent summarized links 62, 72, 102) plus the interconnecting links 86 of domain D, and inter-domain links 94, rather than twenty-seven nodes 12, 14, 22, 24, 82, 84, 88, 90 and forty-one interconnecting links 16, 26, 86, 92 plus the inter-domain links 94. The reduction in the number of links and nodes to be considered results in the time required to carry out path computations from within domain D being significantly reduced.

It will be appreciated the router controller may alternatively comprise a path computation element or a network node.

A third embodiment of the invention provides a computer program product comprising program code for performing the steps of the method 30 of generating network topology parameters of a communications network domain 10, 20 comprising a plurality of network nodes 12, 14, 22, 24 and a plurality of interconnecting links 16, 26.

A fourth embodiment of the invention provides a data carrier having computer readable instructions embodied therein for providing access to resources available on a processor 112, the computer readable instructions comprising instructions to cause the processor 112 to perform the steps of the method 30 of generating network topology parameters of a communications network domain 10, 20 comprising a plurality of network nodes 12, 14, 22, 24 and a plurality of interconnecting links 16, 26.

A fifth embodiment of the invention provides a communications network path computation engine configured to implement the method 30 of generating network topology parameters of a communications network domain 10, 20 comprising a plurality of network nodes 12, 14, 22, 24 and a plurality of interconnecting links 16, 26.

The invention claimed is:

1. A method of generating network topology parameters of a communications network domain comprising a plurality of network nodes and a plurality of interconnecting links, the method comprising:
   identifying those of the network nodes configured to interface with one or more other network domains as summarized nodes;
   identifying a plurality of available network domain paths between a pair of summarized nodes, at least one of said available network domain paths between said pair of summarized nodes comprising at least one other network node and respective interconnecting links;
   generating network topology parameters for said pair of summarized nodes, each network topology parameter being dependent on a respective transmission parameter of the said available network domain paths;
   determining whether a transmission parameter of a first of said available network domain paths would allow that path to be bundled with another one of said available network domain paths;
   comparing any such transmission parameter with a transmission parameter of any previously determined paths to determine whether there exits a previously determined path which has a matching transmission parameter; and
   forming a bundled path, in response to determining a matching transmission parameter is found, by adding a bandwidth of the first of said available network domain paths to a bandwidth of said other path.

2. The method as claimed in claim 1, wherein the method further comprises identifying one or more available network domain paths between the summarized nodes of each of a plurality of pairs of summarized nodes, and generating network topology parameters for each said pair of summarized nodes.

3. The method as claimed in claim 1, wherein the method further comprises advertising said network topology parameters to another network domain.

4. The method as claimed in claim 1, wherein the identifying of each available network domain path and generating network topology parameters for said pair of summarized nodes are performed by applying a Bellman-Ford algorithm.

5. The method as claimed in claim 4, wherein the Bellman-Ford algorithm performs a number of relaxation steps dependent on the number of network nodes.

6. The method as claimed in claim 5, wherein the method further comprises generating the network topology parameters by the Bellman-Ford algorithm returning one or more transmission parameters for the path being identified during each said relaxation step.

7. The method as claimed in claim 1, wherein said transmission parameter comprises one of bandwidth, administrative color, administrative cost, traffic engineering cost, optical signal to noise ratio (OSNR), polarization mode dispersion (PMD) and nonlinear phase shift (NLPS).

8. The method as claimed in claim 6, wherein the method further comprises generating the network topology parameters by comparing said returned transmission parameters with network domain resource parameters and if one of the network domain resource parameters has a lower value than the respective transmission parameter, setting the transmission parameter to the network domain resource parameter value.

9. The method as claimed in claim 1, wherein each network node is provided with a transport network assigned address, and wherein at least one of the summarized nodes has the transport network assigned address of one or more of the network nodes associated with it.

10. A communications monitoring apparatus for monitoring a communications network domain comprising a plurality of network nodes and a plurality of interconnecting links, the apparatus comprising:
   a processor; and
   memory, having stored therein, instructions, that when executed by the processor, cause the processor to:
      identify network nodes configured to interface with one or more other network domains as summarized nodes;
      identify a plurality of available paths between a pair of summarized nodes, at least one of said available paths between said pair of summarized nodes comprising at least one other network node and respective interconnecting links;
      generate network topology parameters for respective pairs of summarized nodes, the network topology parameters being dependent on the transmission parameters of said available paths between each said respective pair of summarized nodes;
      determine whether a transmission parameter of a first of said available paths would allow that path to be bundled with another one of said available paths;
      compare any such transmission parameter with a transmission parameter of any previously determined paths to determine whether there exits a previously determined path which has a matching transmission parameter; and
      form a bundled path, in response to determining a matching transmission parameter is found, by adding a bandwidth of the first of said available paths to the bandwidth of said other path.

11. The communications monitoring apparatus as claimed in claim 10, wherein the network topology parameters are dependent on the corresponding transmission parameters of said one or more available paths.

12. The communications monitoring apparatus as claimed in claim 10, wherein the communications monitoring apparatus comprises one of a path computation element, a router controller and a network node.

13. The communications monitoring apparatus as claimed in claim 10, wherein the instructions, when executed by the processor, also cause the processor to advertise said network topology parameters to another network domain or another communications monitoring apparatus.

14. The communications monitoring apparatus as claimed in claim 10, wherein the communications monitoring apparatus is further arranged to receive network topology parameters relating to another communications network domain.

15. The communications monitoring apparatus as claimed in claim 10, wherein each network node is provided with a transport network assigned address, and the instructions, when executed by the processor, also cause the processor to associate the transport network assigned address of one or more of the network nodes with at least one of the summarized nodes and to advertise to another communications network monitoring apparatus said transport network assigned address associated with said summarized node.

16. The communications monitoring apparatus as claimed in claim 10, wherein the instructions, when executed by the processor, also cause the processor to identify network nodes that are configured to interface with one or more other network domains as summarized nodes and to generate network topology parameters for respective pairs of summarized nodes each time the network domain is modified.

17. The communications monitoring apparatus as claimed in claim 10, wherein the instructions, when executed by the processor, also cause the processor to identify network nodes that are configured to interface with one or more other network domains as summarized nodes and to generate network topology parameters for respective pairs of summarized nodes at a predetermined frequency.

18. A non-transitory, computer readable medium that provides instructions that, if executed by a processor, will cause the processor to perform the steps for generating network topology parameters of a communications network domain comprising a plurality of network nodes and a plurality of interconnecting links comprising:
- identifying those of the network nodes configured to interface with one or more other network domains as summarized nodes;
- identifying a plurality of available network domain paths between a pair of summarized nodes, at least one of said available network domain paths between said pair of summarized nodes comprising at least one other network node and respective interconnecting links;
- generating network topology parameters for said pair of summarized nodes, each network topology parameter being dependent on a respective transmission parameter of the said available network domain paths;
- determining whether a transmission parameter of a first of said available network domain paths would allow that path to be bundled with another one of said available network domain paths;
- comparing any such transmission parameter with a transmission parameter of any previously determined paths to determine whether there exits a previously determined path which has a matching transmission parameter; and
- forming a bundled path, in response to determining a matching transmission parameter is found, by adding a bandwidth of the first of said available network domain paths to a bandwidth of said other path.

19. The non-transitory computer readable medium as claimed in claim 18, wherein the method further comprises identifying one or more available network domain paths between the summarized nodes of each of a plurality of pairs of summarized nodes, and generating network topology parameters for each said pair of summarized nodes.

20. The non-transitory computer readable medium as claimed in claim 18, wherein the method further comprises advertising said network topology parameters to another network domain.

21. The non-transitory computer readable medium as claimed in claim 18, wherein the steps of identifying each available network domain path and generating network topology parameters for said pair of summarized nodes are performed by applying a Bellman-Ford algorithm.

22. The non-transitory computer readable medium as claimed in claim 21, wherein the Bellman-Ford algorithm performs a number of relaxation steps dependent on the number of network nodes.

23. The non-transitory computer readable medium as claimed in claim 22, wherein the method further comprises generating the network topology parameters by the Bellman-Ford algorithm returning one or more transmission parameters for the path being identified during each said relaxation step.

24. The non-transitory computer readable medium as claimed in claim 18, wherein a said transmission parameter comprises one of bandwidth, administrative color, administrative cost, traffic engineering cost, optical signal to noise ratio (OSNR), polarization mode dispersion (PMD) and non-linear phase shift (NLPS).

25. The non-transitory computer readable medium as claimed in claim 23, wherein the method further comprises generating the network topology parameters by comparing said returned transmission parameters with network domain resource parameters and if one of the network domain resource parameters has a lower value than the respective transmission parameter, setting the transmission parameter to the network domain resource parameter value.

26. The non-transitory computer readable medium as claimed in claim 18, wherein each network node is provided with a transport network assigned address, and wherein at least one of the summarized nodes has the transport network assigned address of one or more of the network nodes associated with it.

* * * * *

UNITED STATES PATENT AND TRADEMARK OFFICE
CERTIFICATE OF CORRECTION

PATENT NO. : 8,711,719 B2  
APPLICATION NO. : 13/132904  
DATED : April 29, 2014  
INVENTOR(S) : Bottari et al.

Page 1 of 1

It is certified that error appears in the above-identified patent and that said Letters Patent is hereby corrected as shown below:

In the specification

In Column 9, Line 40, delete "TEM 31" and insert -- TEM 30 --, therefor.

In Column 10, Line 48, delete "(70,1,3" and insert -- (70,1,3) --, therefor.

In the claims

In Column 13, Line 27, in Claim 1, delete "exits" and insert -- exists --, therefor.

In Column 14, Line 30, in Claim 10, delete "exits" and insert -- exists --, therefor.

In Column 15, Line 34, in Claim 18, delete "exits" and insert -- exists --, therefor.

Signed and Sealed this
Twenty-fourth Day of November, 2015

Michelle K. Lee
*Director of the United States Patent and Trademark Office*